UNITED STATES PATENT OFFICE.

CLINTON E. DOLBEAR, OF BERKELEY, CALIFORNIA, ASSIGNOR TO ELIJAH H. MERRILL, OF BERKELEY, CALIFORNIA.

PROCESS OF RECOVERING SODIUM AND POTASSIUM SALTS FROM MIXTURES THEREOF.

1,088,216.       Specification of Letters Patent.       Patented Feb. 24, 1914.

No Drawing.       Application filed April 10, 1912. Serial No. 689,878.

*To all whom it may concern:*

Be it known that I, CLINTON E. DOLBEAR, a citizen of the United States, residing at Berkeley, in the county of Alameda and State of California, have invented new and useful Improvements in Processes of Recovering Sodium and Potassium Salts from Mixtures Thereof, of which the following is a specification.

The present invention relates to a method of separately recovering the more valuable constituents of a saline liquor such as is found in Searles Borax Lake in San Bernardino county, California. The constituent salts of this liquor are: sodium chlorid, about 1/2, sodium sulfate, about 1/6, sodium carbonate, about 1/7, potassium chlorid, about 1/7, sodium biborate about 1/21.

The object of the invention is to provide a process by which the valuable constituents of said liquor may be recovered at a cost sufficiently low to permit of its commercial use.

The following are the steps of my improved process:—The solution is subjected in separate vessels to evaporation at a temperature greater than 33° C., whereby NaCl and $Na_2SO_4$ are crystallized out, until the solution becomes saturated with some, one or more of the other contained salts, and at that point to a lowering of the temperature to not below 18° C., whereby are crystallized out portions of the salts other than NaCl and $Na_2SO_4$. The lower temperature should not be below 18° C., below which $$Na_2SO_4.10H_2O$$

would re-form and precipitate. At the above temperatures, the $Na_2SO_4$ is precipitated with the NaCl. The salts crystallized out on lowering of the temperature consists of $Na_2CO_3$, $Na_2B_4O_7$ and KCl. These are then separated from the mother liquor in any known or suitable way, and are subsequently redissolved in water to saturation and then subjected to further treatment as follows:—
The $Na_2CO_3$ is precipitated as $NaHCO_3$ by passing $CO_2$ through the solution. The solution is then treated with a more or less soluble compound of an alkaline earth metal such as $Ca(OH)_2$ or $CaCl_2$ whereby the $Na_2B_4O_7$ is converted into $CaB_4O_7$ and 2NaOH, or 2NaCl, as the case may be. The 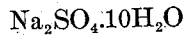 is insoluble and precipitates out. The KCl is then recovered by ordinary evaporation. The residual solution, remaining at the end of the first-named step of evaporating at a higher temperature and then lowering the temperature is added to a fresh supply of the original solution and the process is continued indefinitely. After each precipitation, the residual solution and the precipitate would naturally be separated from each other. The separation can be effected in any known or suitable way.

By first eliminating sodium chlorid and sodium sulfate from the liquor by fractional crystallization, I am enabled to obtain a crude mixture of salts which can be shipped at a low rate to a point where they can be refined at a low cost of labor and fuel, and under other favorable conditions.

The mixture of sodium sulfate and sodium chlorid can be disposed of as may be desired. Unless the market price of these salts should exceed the cost of getting them to market (including the cost of separating them, if required for marketing) it would be best to leave them in the vicinity of the place of original production. The ability to do this and thus to avoid expense for transporting such low priced substances to a place where the remaining steps of the process can best be formed is an advantage of the present method.

In an application which I filed of even date herewith and which has been officially numbered 689,877 I have described a process for separately recovering saline substances from the aforesaid liquor of Searles Borax Lake which consists in (1) passing carbon dioxid through said liquor in order to precipitate sodium bicarbonate, (2) treating the residual solution with a more or less soluble compound of an alkaline earth metal, such as calcium hydroxid or calcium chlorid in order to obtain the boric acid of the sodium biborate in an insoluble form, (3) subjecting the residual solution to evaporation at a temperature greater than 33° C. until saturated with potassium chlorid in order to crystallize sodium chlorid and sodium sulfate out of the solution, and (4) lowering the temperature to not below 18° C. in order to crystallize potassium chlorid out of the solution.

Those features (to wit, all and singular the new, useful and original parts, improvements and combinations) which are common to the two processes are intended to be claimed in my said application of even date No. 689,877. Those features in which the processes differ from each other are severally claimed in the respective applications.

I claim:—

1. The method of separately recovering saline substances from a solution containing sodium carbonate, sodium biborate, potassium chlorid, sodium sulfate and sodium chlorid which consists in, first, separating sodium chlorid and sodium sulfate from other salts by subjecting the solution to evaporation at a temperature greater than 33° C. and to a lowering of the temperature to not below 18° C. redissolving the precipitated sodium carbonate, sodium biborate and potassium chlorid, passing through the solution carbon dioxid to form and precipitate sodium bicarbonate, then mixing the solution with a more or less soluble compound of an alkaline earth metal to precipitate therefrom the corresponding biborate, and then recovering the potassium chlorid by ordinary evaporation.

2. The method of separately recovering saline substances from a solution containing sodium carbonate, sodium biborate, potassium chlorid, and sodium chlorid which consists in, first, separating sodium chlorid from other salts by subjecting the solution to evaporation at a higher temperature and to a lowering of the temperature, redissolving the precipitated sodium carbonate, sodium biborate and potassium chlorid, passing through the solution carbon dioxid to form and precipitate sodium bicarbonate, then mixing the solution with a more or less soluble compound of an alkaline earth metal to precipitate therefrom the corresponding biborate, and then recovering the potassium chlorid by ordinary evaporation.

3. The method of separately recovering saline substances from a solution containing sodium carbonate, sodium biborate, potassium chlorid, sodium sulfate and sodium chlorid, which consists in subjecting the solution (1) to evaporation at a temperature greater than 33° C. for separation of sodium chlorid and sodium sulfate, and the so evaporated solution (2) to a lowering of temperature to not below 18° C. for separation of a mixture of sodium carbonate, sodium biborate and potassium chlorid, (3) mixing the residual solution with a fresh supply of the original solution, (4) repeating said evaporation and lowering of temperature, in order to obtain additional yields of sodium chlorid and sodium sulfate by evaporation and of said three salt mixture by lowering of temperature, (5) redissolving said three salt mixture, (6) passing carbon dioxid through the so formed solution for precipitation of sodium bicarbonate, (7) mixing the residual solution with a more or less soluble compound of an alkaline earth metal for precipitation of the corresponding biborate, and (8) evaporating the then remaining solution for recovery of potassium chlorid.

4. The method of separately recovering saline substances from a solution containing sodium carbonate, sodium biborate, potassium chlorid and sodium chlorid, which consists in subjecting the solution (1) to evaporation at a higher temperature for separation of sodium chlorid, and the so evaporated solution (2) to a lowering of temperature for separation of a mixture of sodium carbonate, sodium biborate and potassium chlorid, (3) mixing the residual solution with a fresh supply of the original solution, (4) repeating said evaporation and lowering of temperature in order to obtain additional yields of sodium chlorid by evaporation and of said three salt mixture by lowering of temperature, (5) redissolving said three salt mixture, (6) passing carbon dioxid through the so formed solution for precipitation of sodium bicarbonate, (7) mixing the residual solution with a more or less soluble compound of an alkaline earth metal for precipitation of the corresponding biborate, and (8) evaporating the then remaining solution for recovery of potassium chlorid.

5. The method of separately recovering saline substances from a solution containing sodium and potassium salts, which method consists in (1) subjecting such a solution whose salts in part decrease and in part increase in solubility in the mother liquor with lowering of temperature and include sodium biborate in addition to potassium chlorid to a cooling of the solution saturated with sodium biborate and potassium chlorid through a temperature interval in which part of the original salts increase in solubility as the temperature is lowered in order to separate a mixture of salts which include sodium biborate and potassium chlorid, (2) redissolving the so separated mixture, and (3) mixing the resulting solution with a more or less soluble compound of an alkaline earth metal in order to obtain the boric acid of said sodium biborate in an insoluble form in which it is readily separable from the potassium salt.

6. The method of separately recovering saline substances from a solution containing sodium and potassium salts, which method consists in (1) subjecting such a solution whose salts in part decrease and in part increase in solubility in the mother liquor with lowering of temperature and include both sodium carbonate and sodium biborate in addition to potassium chlorid to a cooling of the solution saturated with all three of the last mentioned salts through a temperature interval in which part of the original salts increase in solubility as the temperature is lowered in order to separate a mixture of salts which include sodium carbonate, sodium biborate and potassium chlorid, (2) redissolving the so separated mixture, and subjecting the resulting solution to the action (3) of carbon dioxid in order to convert sodium carbonate into sodium bicarbonate and (4) of a more or less soluble compound of an alkaline earth metal in order to convert the boric acid of the sodium biborate into a salt of the alkaline earth metal.

7. The method of separately recovering saline substances from a solution containing sodium and potassium salts, which method consists in (1) heating such a solution whose salts include both sodium sulfate and sodium biborate in addition to potassium chlorid to a temperature above 33° C. in order to have said solution in a condition in which its capacity to hold sodium sulfate in solution decreases with increase of temperature and increases with decrease of temperature, (2) bringing said solution to saturation with both sodium biborate and potassium chlorid while said solution remains in the condition mentioned with respect to sodium sulfate, (3) lowering the temperature of the solution to not below 18° C. in order to separate a mixture of sodium biborate and potassium chlorid while the sodium sulfate remains in solution, (4) redissolving the so separated mixture, and (5) mixing the resulting solution with a more or less soluble compound of an alkaline earth metal in order to obtain the boric acid of said sodium biborate in an insoluble form in which it is readily separable from the potassium salt.

8. The method of separately recovering saline substances from a solution containing sodium and potassium salts, which method consists in (1) heating such a solution whose salts include both sodium sulfate and sodium carbonate in addition to both sodium biborate and potassium chlorid to a temperature above 33° C. in order to have said solution in a condition in which its capacity to hold sodium sulfate in solution decreases with increase of temperature and increases with decrease of temperature, (2) bringing said solution to saturation with sodium carbonate as well as with both sodium biborate and potassium chlorid while said solution remains in the condition mentioned with respect to sodium sulfate, (3) lowering the temperature of the solution to not below 18° C. in order to separate a mixture of sodium carbonate, sodium biborate and potassium chlorid while the sodium sulfate remains in solution, (4) redissolving the so separated mixture, and subjecting the resulting solution to the action (5) of carbon dioxid in order to convert sodium carbonate into sodium bicarbonate, and (6) of a more or less soluble compound of an alkaline earth metal in order to convert the boric acid of the sodium biborate into a salt of said alkaline earth metal.

9. The method of separately recovering saline substances from a solution containing sodium and potassium salts, which method consists in (1) heating such a solution whose salts include both sodium sulfate and sodium biborate to a temperature above 33° C. in order to have said solution in a condition in which its capacity to hold sodium sulfate in solution decreases with increase of temperature and increases with decrease of temperature, (2) bringing said solution to saturation with sodium biborate while said solution remains in the condition mentioned with respect to sodium sulfate, and (3) lowering the temperature to not below 18° C. in order to separate sodium biborate while the sodium sulfate remains in solution.

10. The method of separately recovering saline substances from a solution containing sodium and potassium salts, which method consists in (1) heating such a solution whose salts include both sodium sulfate and sodium carbonate to a temperature above 33° C. in order to have said solution in a condition in which its capacity to hold sodium sulfate in solution decreases with increase of temperature and increases with decrease of temperature, (2) bringing said solution to saturation with sodium carbonate while said solution remains in the condition mentioned with respect to sodium sulfate, and (3) lowering the temperature of the solution to not below 18° C. in order to separate sodium carbonate while the sodium sulfate remains in solution.

In testimony whereof I have hereunto set my hand in the presence of two subscribing witnesses.

CLINTON E. DOLBEAR.

Witnesses:
   FRANCIS M. WRIGHT,
   D. B. RICHARDS.